US006614286B1

(12) United States Patent
Tang

(10) Patent No.: US 6,614,286 B1
(45) Date of Patent: Sep. 2, 2003

(54) AUTO-RANGING CURRENT INTEGRATION CIRCUIT

(75) Inventor: Andrew T. K. Tang, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/171,109

(22) Filed: Jun. 11, 2002

Related U.S. Application Data

(60) Provisional application No. 60/297,909, filed on Jun. 12, 2001.

(51) Int. Cl.[7] .................... G06F 7/64
(52) U.S. Cl. .................... 327/337
(58) Field of Search .................... 327/336, 337, 327/554, 561–563, 170, 52, 56, 60, 72, 89; 330/282, 86, 110, 9

(56) References Cited

U.S. PATENT DOCUMENTS 4,446,438 A * 5/1984 Chang et al. .......... 327/337
5,602,511 A * 2/1997 Woolaway .......... 330/282
5,680,070 A * 10/1997 Anderson et al. .......... 327/336
5,973,536 A * 10/1999 Maejima .......... 327/337
6,339,363 B1 * 1/2002 Fowler .......... 330/308
6,452,444 B1 * 9/2002 Mehr .......... 327/554

OTHER PUBLICATIONS

Dual Current Input 20–Bit Analog–To–Digital Converter, Burr–Brown Products from Texas Instruments, DDC112, SBAS085A (Jan. 2000), pp. 1–29.

Low Noise, Dual Switched Integrator, Burr–Brown, ACF2101, SBES003, (Sep. 1994) pp.1–15.

Precision Switched Integrator Transimpedance Amplifier, Burr–Brown, IVC102, Jun. 1996), pp. 1–11.

* cited by examiner

*Primary Examiner*—My-Trang Nu Ton
(74) *Attorney, Agent, or Firm*—Koppel, Jacobs, Patrick & Heybl

(57) ABSTRACT

An auto-ranging current integration circuit includes an operational amplifier which receives an input current to be integrated, and an array of integration capacitors which are switchably connected in parallel between the op amp's output and inverting input. A control circuit initially connects a first capacitor across the op amp, and then connects additional capacitors in parallel with the first whenever the op amp's output exceeds a predetermined voltage, but before the output becomes saturated. In this way, a smaller integration capacitance is automatically employed for a small input current, and larger capacitance values are automatically switched in for larger input currents, which lowers the integration gain, prevents the output from saturating, and keeps the current integration circuit's signal-to-noise ratio high.

17 Claims, 5 Drawing Sheets

AUTO-RANGING CURRENT INTEGRATION CIRCUIT

This application claims the benefit of provisional patent application No. 60/297,909 to Tang, filed Jun. 12, 2001.

BACKGROUND OF THE INVENTION

1. Field of the Invention

This invention relates to the field of current integration circuits.

2. Description of the Related Art

It is often necessary to know the magnitude of a particular current over time. This can be determined with a current integrator.

Current integrators are well-known; a basic implementation is shown in FIG. 1. An operational amplifier A1 receives the current to be integrated $I_{in}$ at its inverting input, with its non-inverting input grounded. A fixed integration capacitor C is connected between the op amp's output and inverting input. A switch SR is connected across capacitor C, which resets the integrator when closed. Input current $I_{in}$, is integrated on capacitor C to produce an output voltage $V_{out}$ from A1.

This arrangement suffers a number of shortcomings, however. If $V_{max}$ is the maximum output voltage that A1 can produce, then the maximum charge $Q_{max}$ that can be stored on integration capacitor C without causing A1's output to become saturated is given by $Q_{max}=V_{max}*C$. Thus, to achieve a high $Q_{max}$ requires a large C value.

The minimum charge $Q_{min}$ that can be detected is also often of interest. This is also largely determined by the value of C. A small C value gives the circuit a high integration gain; i.e., $V_{out}$ changes quickly for a given input current. Thus, a small C value allows small charges to be detected, but also results in a small $Q_{max}$ value. A large C value gives a lower integration gain ($V_{out}$ changes more slowly for the same input current) and a larger $Q_{max}$ value, but also increases the minimum charge $Q_{min}$ that can be detected. These conflicting requirements act to narrow the range of input currents which can be accurately integrated with the FIG. 1 circuit.

One approach to solving this problem in shown in FIG. 2. An array of integration capacitors such as $C_a$, $C_b$ and $C_c$ are used to allow different integration gains to be selected, using respective switches $S_a$, $S_b$ and $S_c$. However, this arrangement conventionally requires that the capacitors, and thus the integration gain, be selected before the input current is integrated. If the magnitude of the input current or charge is unknown, it is difficult to select the correct capacitance to provide an integration gain which maximizes the integrator's signal-to-noise ratio.

SUMMARY OF THE INVENTION

An auto-ranging current integration circuit is presented which overcomes the problems noted above.

The present circuit includes an operational amplifier which receives an input current to be integrated. Initially, a first integration capacitor is connected between the op amp's output and inverting input, which integrates the input current and causes the op amp's output voltage to increase. Additional integration capacitors may be switchably connected in parallel with the first integration capacitor.

A control circuit operates the switches which select the additional integration capacitors. The control circuit is arranged to close one of the switches and thereby connect an additional integration capacitor in parallel with the first capacitor whenever the op amp's output exceeds a predetermined reference voltage, but before the output becomes saturated. In this way, a small integration capacitance is automatically employed for a small input current, and larger capacitance values are automatically switched in for larger input currents—which lowers the integration gain, prevents the output from saturating, and keeps the current integration circuit's signal-to-noise ratio high.

Further features and advantages of the invention will be apparent to those skilled in the art from the following detailed description, taken together with the accompanying drawings.

DETAILED DESCRIPTION OF THE INVENTION

Figure 3:
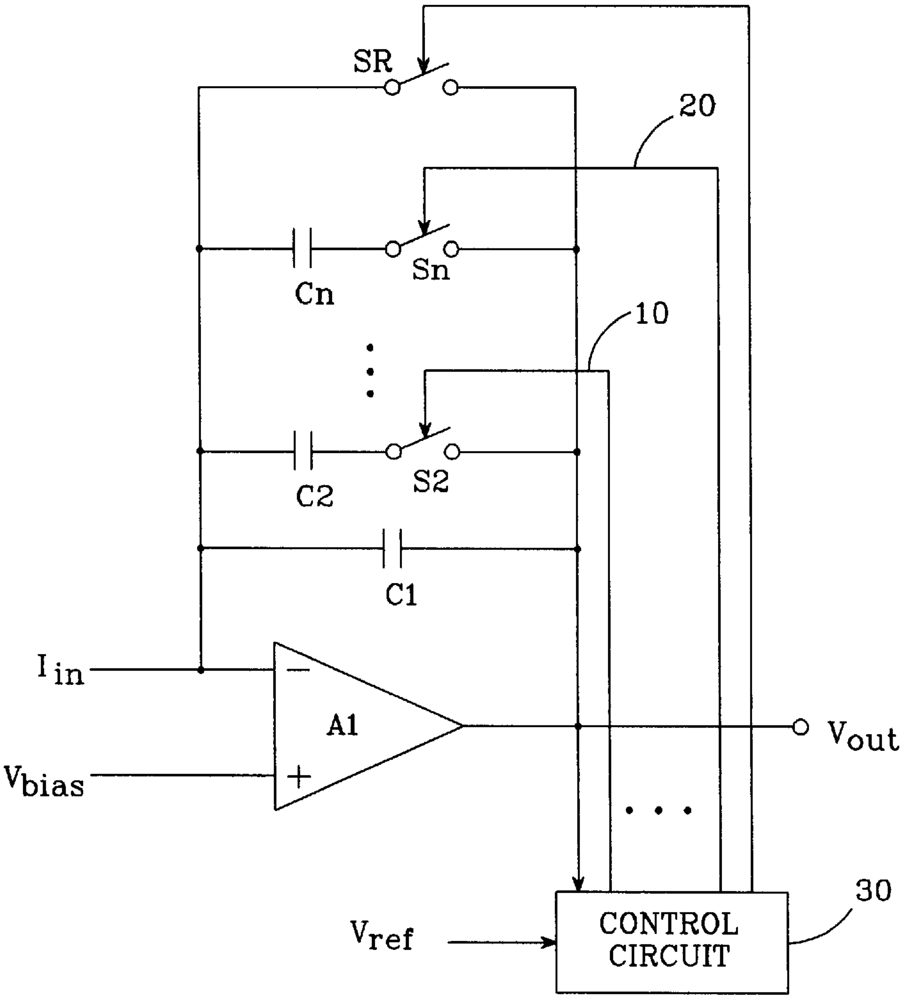
FIG. 3 is a schematic diagram of a current integration circuit in accordance with the present invention.

The basic principles of a current integration circuit per the present invention are illustrated in FIG. 3. An input current $I_{in}$ to be integrated is connected to the inverting input of an operational amplifier A1; A1's non-inverting input is connected to a bias voltage, such as ground.

An integration capacitor C1 is connected between A1's output and inverting input. Input current $I_{in}$ is integrated on C1, which results in an output voltage $V_{out}$ being produced by Al. One or more additional integration capacitors C2, . . . ,Cn are connected in series with respective integration switches S2, . . . ,Sn; when an integration switch is closed, its respective integration capacitor is connected in parallel with C1. The integration switches are opened and closed by means of respective control signals 10, 20 applied to the control inputs of respective switches.

The control signals 10, 20 are provided by a control circuit 30. Control circuit 30 receives the output $V_{out}$ from A1 at one input, and a reference voltage $V_{ref}$ at a second input. Control circuit 30 is arranged to give the current integration circuit an auto-ranging capability. It does this by detecting when $V_{out}$ exceeds reference voltage $V_{ref}$, and closing one of integration switches S2, . . . ,Sn before A1's output becomes saturated. Thus, if input current $I_{in}$ is small, only integration capacitor C1 is connected to A1; this makes the circuit's integration gain and signal-to-noise ratio high. If A1's output increases such that it is close to saturation, control circuit 30 switches in another integration capacitor; this lowers the integration gain and thereby prevents $I_{in}$ from saturating A1's output. If the integration capacitance is still too small, control circuit 30 switches in additional integration capacitors as needed. In this way, the integrated charge is preserved and the integration of input current is not interrupted.

Figure 1:
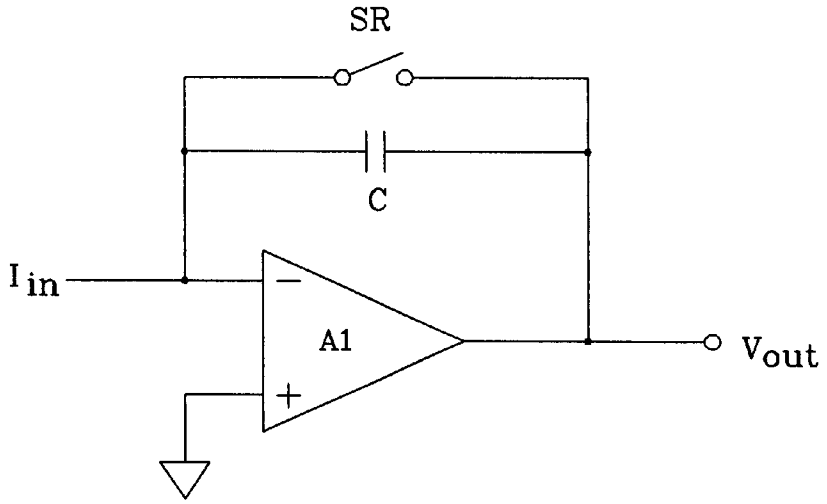
FIG.1 (Prior Art)
FIG. 1 is a schematic diagram of a known current integrator.
Figure 2:
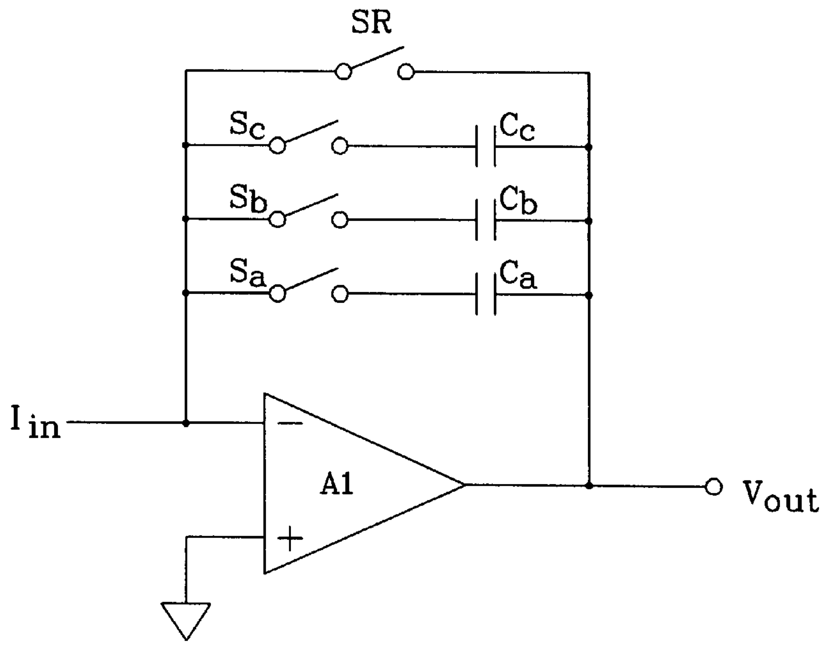
FIG.2 (Prior Art)
FIG. 2 is a schematic diagram of another known current integrator.

A current integration circuit in accordance with the present invention provides a number of advantages. For example, integration switches S2, . . . ,Sn may be operated during current integration, whereas in the prior art of FIG. 2, switches $S_a$–$S_c$ are selected before current integration begins.

A quantizer, such as an analog-to-digital (A/D) converter, might be connected to receive the output of the present current integration circuit. The invention's auto-ranging capability is useful for increasing the dynamic range of charges that can be measured with such a quantizer. For example, if there are two additional integration capacitors C2 and C3, with C2 three times larger than C1 and C3 twelve times larger than C1, the maximum integration capacitance would be 16 times the size of C1. If the total capacitance (C1+C2+C3) were chosen to accommodate a particular full-scale charge, then using just C1 for small charges would increase the circuit's dynamic range by a factor of 16, which is the equivalent of 4 bits.

The present invention preferably includes a reset switch SR which is connected between the op amp's output and inverting input and is also controlled by control circuit 30. In operation, prior to integrating $I_{in}$, reset switch SR and each of switches S2, . . . ,Sn are closed, thereby resetting or discharging the integration capacitors. All the switches are then opened, allowing an unknown input current $I_{in}$ to be integrated using C1. If $I_{in}$ is such that A1's output approaches saturation, control circuit 30 closes additional integration switches as needed, in the manner described above.

Figure 4:
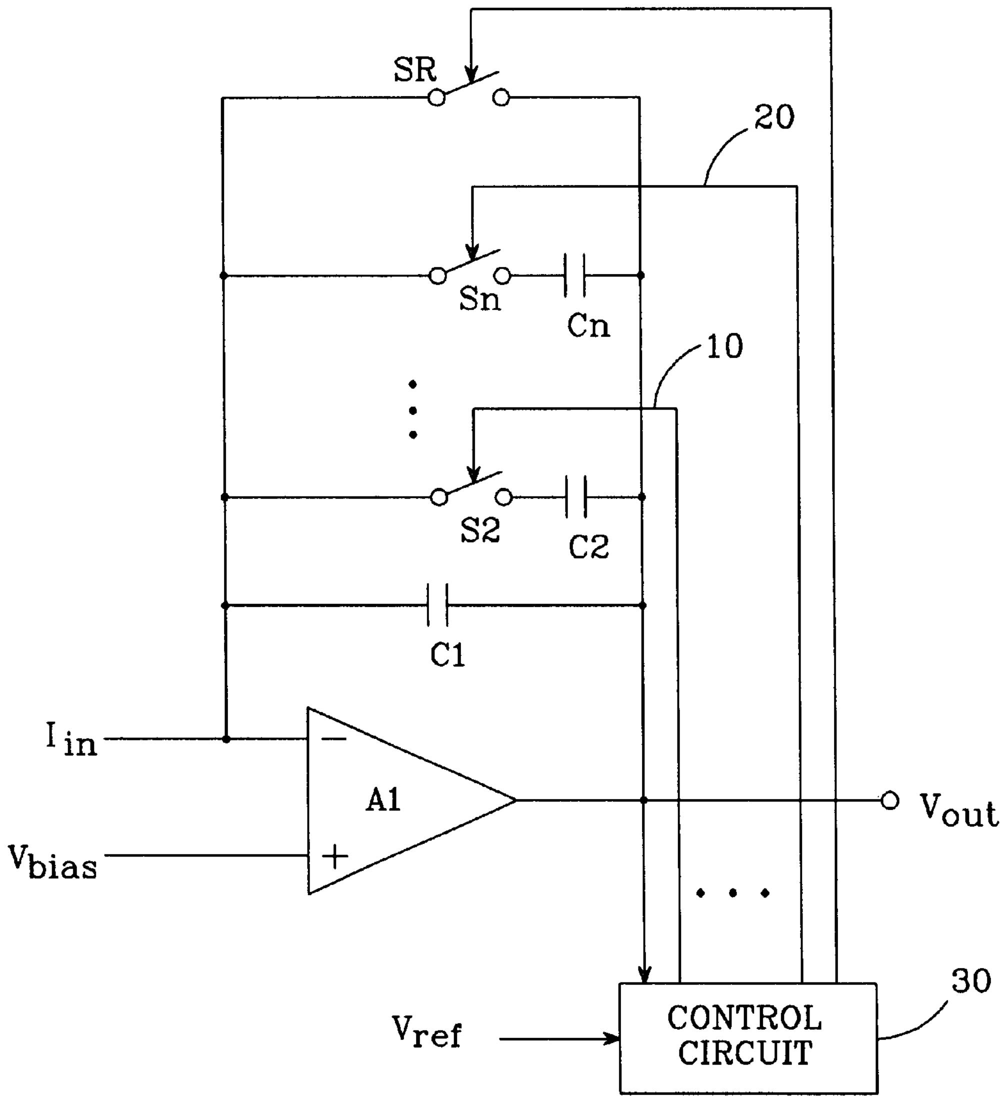
FIG. 4 is an alternative embodiment of a current integration circuit in accordance with the present invention.

The positions of additional integration capacitors C2, . . . ,Cn and integration switches S2, . . . ,Sn may be reversed without greatly affecting the operation of the integrator. This implementation is shown in FIG. 4.

Figure 5:
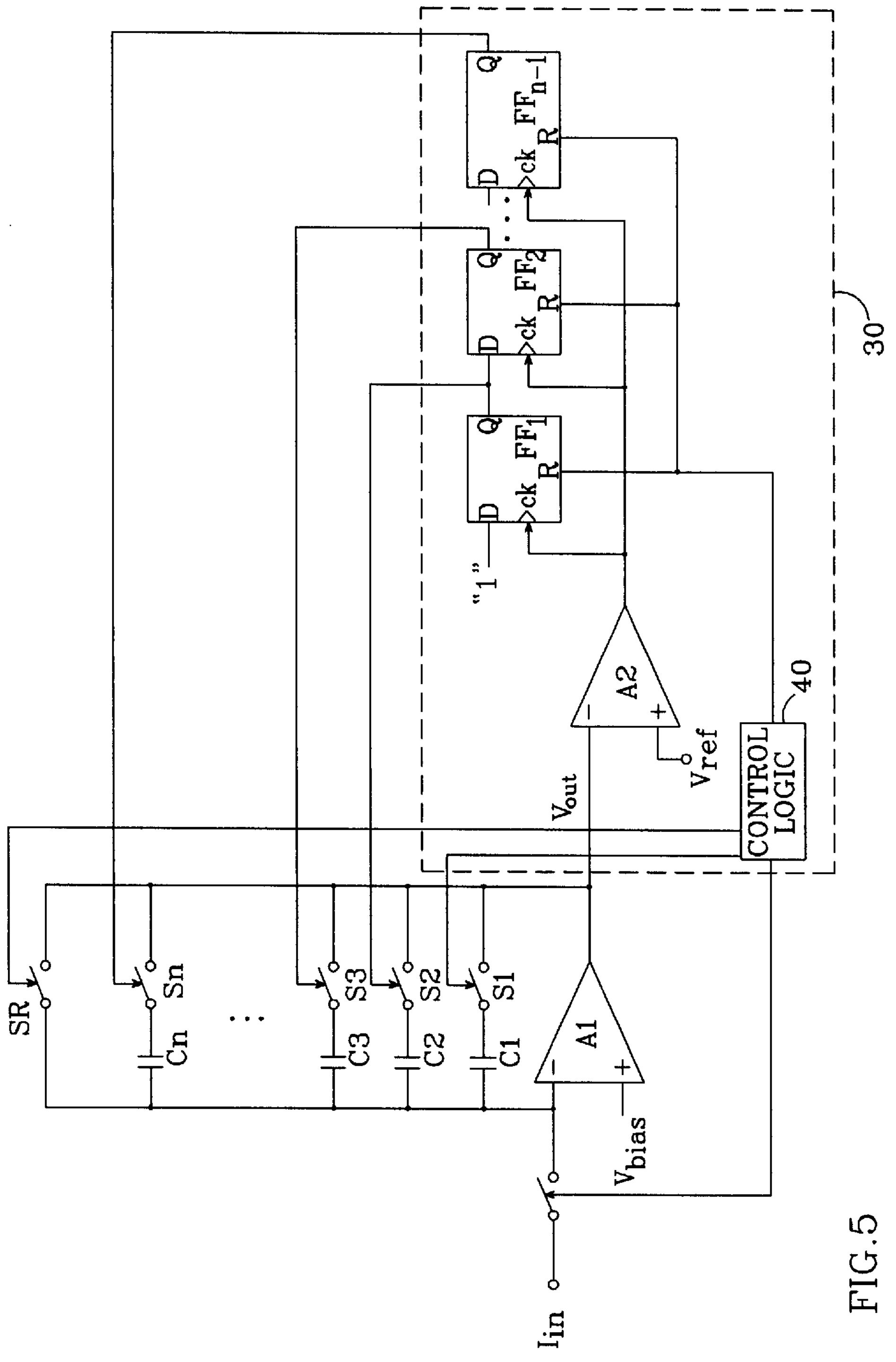
FIG. 5 is a schematic diagram of a preferred embodiment of a current integration circuit in accordance with the present invention.

A preferred embodiment of the invention is shown in FIG. 5. Integration capacitors C1, . . . ,Cn are arrayed as before, with each capacitor (including C1 in this embodiment) connected in series with a respective integration switch S1, . . . ,Sn. Reset switch SR is connected between A1's output and inverting input, and an input switch $S_{in}$ is connected between the input current to be integrated ($I_{in}$) and A1's input.

Control circuit 30 preferably comprises a comparator A2 which receives $V_{out}$ at one input and $V_{ref}$ at a second input; A2's output goes high ("toggles") when $V_{out}$ exceeds $V_{ref}$, and goes low when $V_{out}$ falls back below $V_{ref}$. A2's output is used to clock a number of D-type flip-flops $FF_1$, $FF_2$, . . . ,$FF_{n-1}$. The flip-flops are connected in series, with the Q output of one flip-flop connected to the D input of the next flip-flop; the D input of the first flip-flop in the series is connected to a logic "1". The Q outputs of $FF_1$, $FF_2$, . . . ,$FF_{n-1}$ are connected to the control inputs of respective ones of switches S2, . . . ,Sn. Control circuit 30 also includes control logic 40, which acts to initiate and terminate an integration cycle.

In operation: initially, control logic 40 resets D flip-flops $FF_1$, $FF_2$, . . . ,$FF_{n-1}$, opens input switch $S_{in}$, and closes each of S1, . . . ,Sn and SR to reset the integration capacitors. Means for simultaneously closing each of switches S1, . . . ,Sn are not shown, but are well-known to those of ordinary skill in the art of logic circuit design. Switches S1, . . . ,Sn are then opened. An integration cycle is begun by closing $S_{in}$ and S1, such that unknown input current $I_{in}$ is integrated using C1. C1 is preferably the smallest integration capacitor in the array, as this will optimize the signal-to-noise ratio for a small input current.

Output voltage $V_{out}$ will increase as the integration continues. If input current $I_{in}$ is sufficiently large, the output of A1 will approach saturation—which occurs when $V_{out}$ reaches $V_{max}$. Reference voltage $V_{ref}$ is preferably set to a value less than $V_{max}$, and also slightly lower than the maximum input of the quantizer, such that the output of comparator A2 toggles before A1's output saturates or before the quantizer saturates.

When $V_{out}$ exceeds $V_{ref}$, the output of comparator A2 goes high, which provides a clock tick to each of the D flip-flops. The D input of $FF_1$ is hard-wired to a logic "1", so that when clocked, $FF_1$'s Q output goes high and closes integration switch S2. This connects integration capacitor C2 in parallel with C1, which lowers $V_{out}$ and the circuit's integration gain; with $V_{out}$ now less than $V_{ref}$, the output of comparator A2 goes low. The integrated charge is now preserved and shared between C1 and C2, and integration of the input current is not interrupted.

If $V_{out}$ again exceeds $V_{ref}$ due to the magnitude of $I_{in}$, A2's output will again go high and clock the D flip-flops. The Q output of $FF_1$, set to a logic "1" by the previous clock, is applied to the D input of $FF_2$, so that the new clock causes the Q output of $FF_2$ to go high and close integration switch S3. This connects capacitor C3 in parallel with C2 and C1, lowers the circuit's integration gain and $V_{out}$ (such that A2's output goes low again), and causes the integrated charge to be shared between C1, C2 and C3.

If the integration capacitance is still too small, additional capacitors are added one by one in the same manner. The integration cycle ends when control logic 40 resets D flip-flops $FF_1$, $FF_2$, . . . ,$FF_{n-1}$, opens input switch $S_{in}$, and closes each of integration switches S1, . . . ,Sn and SR to again reset the integration capacitors. In this way, the integration gain is automatically adjusted to avoid the saturation of A1's output, and to keep the circuit's signal-to-noise ratio high.

Note that the embodiment of control circuit 30 shown in FIG. 5 is exemplary; many other circuits could be used to detect the impending saturation of A1's output and to control switches S1, . . . ,Sn accordingly to prevent saturation.

Figure 6:
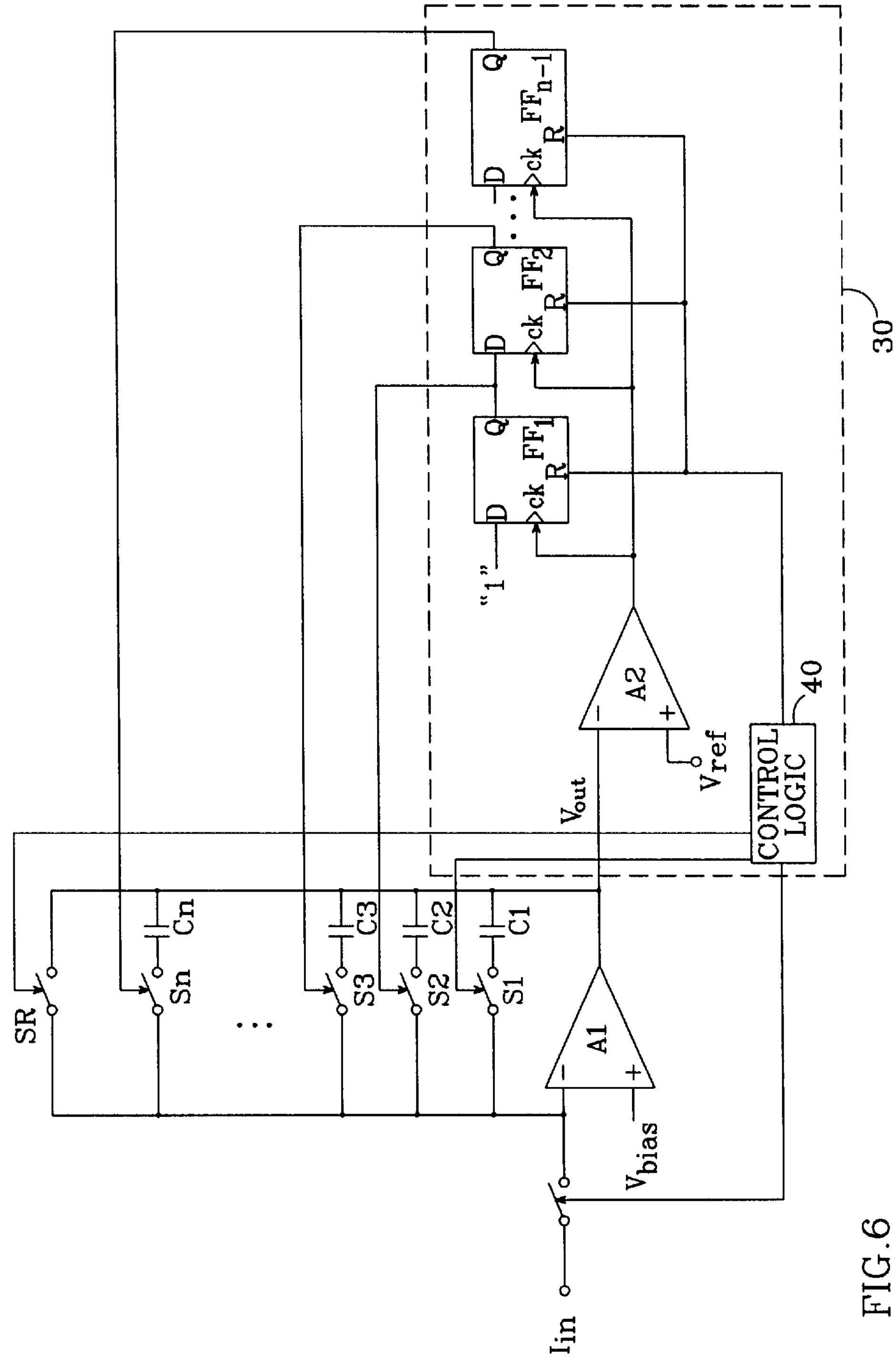
FIG. 6 is an alternative embodiment of a preferred embodiment of a current integration circuit in accordance with the present invention.

As with the circuit of FIG. 3, the positions of integration capacitors C1, . . . ,Cn and integration switches S1, . . . ,Sn in the circuit shown in FIG. 5 may be reversed without greatly affecting the operation of the integrator. This implementation is shown in FIG. 6. Integration switches S1, . . . ,Sn, SR and $S_{in}$ are preferably FET switches, made from one or more FET transistors. The gate of each FET serves as the switch's control input, and its drain and source serve as the switch's signal terminals. Flip-flops $FF_1$–$FF_{n-1}$ are arranged to provide control signals which turn on their respective FET switches such that the resistance between their signal terminals is reduced to near zero. Note that other types of switches, including electromechanical switches, could also be used—as long as they are switchable by means of a control signal and present a near-zero resistance between their signal terminals when closed.

The closure of switches S2, . . . ,Sn causes the current integration circuit's output to change quickly when additional capacitance is switched in; this in turn causes transient voltages to appear at A1's inverting input. These transient voltages can adversely impact the linearity of the input current source (such as a photodiode). As such, it may be desirable to limit the magnitude of the voltage transients. One way to achieve this is to limit the slew rate of the control signals provided to integration switches S2, . . . ,Sn—assuming that the switches are such that the resistance between their signal terminals changes continuously with the control signal (as with FET switches). This can be accomplished with RC networks (not shown), for example, each of which is interposed between the Q output of a D flip-flop and the control input of the flip-flop's respective integration switch.

Another way in which the effect of voltage transients on the input current source can be reduced is by opening switch $S_{in}$ for a brief period whenever any of said integration switches are switched from the open state to the closed state to isolate the input current source from the integration circuit. When switch $S_{in}$ is temporarily opened, the input current will be integrated across the capacitance of the input current source, but this charge will be transferred to C1 when switch $S_{in}$ is closed again.

While particular embodiments of the invention have been shown and described, numerous variations and alternate embodiments will occur to those skilled in the art. Accordingly, it is intended that the invention be limited only in terms of the appended claims.

I claim:

1. An auto-ranging current integration circuit, comprising:

an operational amplifier having its inverting input connected to receive an input current to be integrated, a first integration capacitor connected between said op amp's output and inverting input, said op amp and said integration capacitor arranged such that said input current is integrated on said first integration capacitor, one or more additional integration capacitors, one or more integration switches, each of which is closed and thereby provides a low resistance conductive path in response to a respective control signal applied to a control input, each of said integration switches connected in series with a respective one of said additional integration capacitors between said op amp's output and inverting input, and a control circuit which provides said control signals to said integration switches, said control circuit arranged to provide a control signal to close one of said integration switches and thereby connect an additional one of said integration capacitors between said op amp's output and inverting input whenever said op amp's output exceeds a reference voltage but before it becomes saturated, such that said current integration circuit's integration gain is automatically varied to prevent output saturation as the op amp output increases in response to an input current applied to said op amp's inverting input.

2. The current integration circuit of claim 1, further comprising a reset switch connected between said op amp's output and inverting input, said control circuit arranged to periodically close said reset switch and thereby reset said integration capacitors.

3. The current integration circuit of claim 1, wherein each of said integration switches comprises one or more field-effect transistors (FET).

4. The current integration circuit of claim 3, wherein the slew rate of the control signals which close said integration switches is limited such that the magnitude of transient voltages which arise at said op amp's inverting input due to the closure of said integration switches is reduced.

5. The current integration circuit of claim 1, wherein each of said integration capacitors has first and second terminals and each of said integration switches has first and second signal terminals, the first terminals of said capacitors connected to said op amp's inverting input, the second terminals of said capacitors connected to the first signal terminals of respective ones of said integration switches, and the second signal terminals of said integration switches connected to said op amp's output.

6. The current integration circuit of claim 1, wherein each of said integration capacitors has first and second terminals and each of said integration switches has first and second signal terminals, the first signal terminals of said integration switches connected to said op amp's inverting input, the second signal terminals of said switches connected to the first terminals of respective ones of said capacitors, and the second terminals of said capacitors connected to said op amp's output.

7. An auto-ranging current integration circuit, comprising:

an operational amplifier having its inverting input connected to receive an input current to be integrated, a first integration capacitor connected between said op amp's output and inverting input, said op amp and said integration capacitor arranged such that said input current is integrated on said first integration capacitor, one or more additional integration capacitors, one or more integration switches, each of which is closed in response to a respective control signal applied to a control input, each of said integration switches connected in series with a respective one of said integration capacitors between said op amp's output and inverting input, and a control circuit which provides said control signals to said integration switches, said control circuit arranged to provide a control signal to close one of said integration switches and thereby connect an additional one of said integration capacitors between said op amp's output and inverting input whenever said op amp's output exceeds a reference voltage but before it becomes saturated, such that said current integration circuit's integration gain is automatically varied to prevent output saturation as the op amp output increases in response to an input current applied to said op amp's inverting input, and an input switch connected between said input current and said op amp's inverting input, said control circuit arranged to periodically close said input switch to begin the integration of said input current.

8. The current integration circuit of claim 3, wherein said input current is provided by an input current source and said control circuit is further arranged to provide a control signal to open said input switch for a brief period whenever any of said integration switches is switched from its open state to its closed state such that transient voltages which arise at said op amp's inverting input due to the closure of said integration switches are isolated from said input current source.

9. An auto-ranging current integration circuit, comprising:

an operational amplifier having its inverting input connected to receive an input current to be integrated, a first integration capacitor connected between said op amp's output and inverting input, said op amp and said integration capacitor arranged such that said input current is integrated on said first integration capacitor, one or more additional integration capacitors, one or more integration switches, each of which is closed in response to a respective control signal applied to a control input, each of said integration switches connected in series with a respective one of said integration capacitors between said op amp's output and inverting input, and a control circuit which provides said control signals to said integration switches, said control circuit arranged to provide a control signal to close one of said integration switches and thereby connect an additional one of said integration capacitors between said op amp's output and inverting input whenever said op amp's output exceeds a reference voltage but before it becomes saturated, such that said current integration circuit's integration gain is automatically varied to prevent output saturation as the op amp output increases in response to an input current applied to said op amp's inverting input, said control circuit comprising:

a comparator which receives said op amp's output voltage at one input and said reference voltage at its second input and which toggles its output from a first state to a second state when said op amp's output exceeds said reference voltage, and one or more D flip-flops connected in series such that the Q output of one flip-flop is connected to the D input of the next flip-flop in the series, each of said flip-flops clocked when said comparator output is toggled from said first state to said second state, each of said flip-flop outputs providing a respective one of said control signals such that one additional integration switch is closed each time said comparator output is toggled from said first state to said second state.

10. An auto-ranging current integration circuit, comprising:

an operational amplifier having its inverting input connected to receive an input current to be integrated, a first integration capacitor connected between said op amp's output and inverting input, said op amp and said integration capacitor arranged such that said input current is integrated on said first integration capacitor, one or more additional integration capacitors, one or more integration switches, each of which is closed in response to a respective control signal applied to a control input, each of said integration switches connected in series with a respective one of said integration capacitors between said op amp's output and inverting input, and a control circuit which provides said control signals to said integration switches, said control circuit arranged to provide a control signal to close one of said integration switches and thereby connect an additional one of said integration capacitors between said op amp's output and inverting input whenever said op amp's output exceeds a reference voltage but before it becomes saturated, such that said current integration circuit's integration gain is automatically varied to prevent output saturation as the op amp output increases in response to an input current applied to said op amp's inverting input, and an additional integration switch interposed between said first integration capacitor and said op amp's output, said control circuit further arranged to provide a control signal to close said additional integration switch and thereby connect said first integration capacitor between said op amp's output and inverting input.

11. An auto-ranging current integration circuit, comprising:

an input switch having a control input and first and second signal terminals, said switch arranged such that, when closed in response to a control signal applied to said control input, the resistance between said first and second signal terminals is reduced to near zero, the first terminal of said input switch connected to an input current to be integrated, an operational amplifier having its non-inverting input connected to a bias voltage and its inverting input connected to the second terminal of said input switch, at least two integration capacitors, each of which has first and second terminals, at least two integration switches, each of which has a control input and first and second signal terminals, said switches arranged such that, when closed in response to a control signal applied to said control input, the resistance between said first and second signal terminals is reduced to near zero, each of said integration switches connected in series with a respective one of said integration capacitors between said op amp's output and inverting input, a reset switch connected between said op amp's output and inverting input, and a control circuit which provides said control signals to said switches, said control circuit arranged to:

provide a control signal to close said reset switch and thereby reset said integration capacitors, provide control signals to close said input switch and one of said integration switches, thereby connecting one of said integration capacitors between said op amp's output and inverting input such that said input current is integrated on said selected integration capacitor, and provide a control signal to close another one of said integration switches and thereby connect an additional one of said integration capacitors between said op amp's output and inverting input whenever said op amp's output exceeds a reference voltage but before it becomes saturated, such that said current integration circuit's integration gain is automatically varied to prevent output saturation as the op amp output increases in response to an input current applied to said op amp's inverting input.

12. The current integration circuit of claim 11, wherein said input current is provided by an input current source and said control circuit is further arranged to provide a control signal to open said input switch for a brief period whenever any of said integration switches is switched from its open state to its closed state such that transient voltages which arise at said op amp's inverting input due to the closure of said integration switches are isolated from said input current source.

13. The current integration circuit of claim 11, wherein said control circuit comprises:

a comparator which receives said op amp's output voltage at one input and said reference voltage at its second input and which toggles its output from a first state to a second state when said op amp's output exceeds said reference voltage, and one or more D flip-flops connected in series, such that the Q output of one flip-flop is connected to the D input of the next flip-flop in the series, the D input of the first flip-flop in the series connected to a logic "1", each of said flip-flops clocked when said comparator output is toggled from said first state to said second state, each of said flip-flop outputs providing a respective one of said control signals such that one additional integration switch is closed each time said comparator output is toggled from said first state to said second state.

14. The current integration circuit of claim 11, wherein each of said integration switches comprises one or more field-effect transistors (FET).

15. The current integration circuit of claim 14, wherein the slew rate of the control signals which close said integration switches is limited such that the magnitude of transient voltages which arise at said op amp's inverting input due to the closure of said integration switches is reduced.

16. The current integration circuit of claim 11, wherein each of said integration capacitors has first and second terminals and each of said integration switches has first and second signal terminals, the first terminals of said capacitors connected to said op amp's inverting input, the second terminals of said capacitors connected to the first signal terminals of respective ones of said integration switches, and the second signal terminals of said integration switches connected to said op amp's output.

17. The current integration circuit of claim 11, wherein each of said integration capacitors has first and second terminals and each of said integration switches has first and second signal terminals, the first signal terminals of said integration switches connected to said op amp's inverting input, the second signal terminals of said switches connected to the first terminals of respective ones of said capacitors, and the second terminals of said capacitors connected to said op amp's output.

* * * * *